United States Patent
Eisenhower, Jr. et al.

(10) Patent No.: US 7,059,511 B2
(45) Date of Patent: Jun. 13, 2006

(54) ADJUSTABLE FORCE AND POSITION PRE-LOAD WELDING FIXTURE

(75) Inventors: Gary W. Eisenhower, Jr., Freeport, IL (US); Wayne L. Ehlers, Lanark, IL (US); Brian J. Marsh, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 197 days.

(21) Appl. No.: 10/801,751

(22) Filed: Mar. 15, 2004

(65) Prior Publication Data

US 2005/0199678 A1   Sep. 15, 2005

(51) Int. Cl.
*B23K 31/02* (2006.01)
*B23K 37/04* (2006.01)

(52) U.S. Cl. .................................... 228/212; 228/44.3
(58) Field of Classification Search .............. 228/49.1, 228/49.2, 49.4, 103, 47.1, 49.5, 44.3, 212; 219/121.63, 121.64; 269/86, 100, 238
See application file for complete search history.

(56) References Cited

U.S. PATENT DOCUMENTS

| | | | |
|---|---|---|---|
| 4,216,401 A | | 8/1980 | Wagner .................. 310/313 R |
| 4,454,440 A | | 6/1984 | Cullen .................. 310/313 R |
| 4,804,130 A | * | 2/1989 | Kwan et al. .................. 228/6.2 |
| 4,978,941 A | | 12/1990 | Brown .................. 340/447 |
| 5,181,646 A | * | 1/1993 | Ushiki et al. .................. 228/4.5 |
| 5,244,195 A | * | 9/1993 | Lawrence et al. .......... 269/227 |
| 5,295,700 A | * | 3/1994 | Crews et al. .................. 279/5 |
| 5,362,036 A | * | 11/1994 | Whiteman .................. 269/51 |
| 5,598,775 A | * | 2/1997 | Vongfuangfoo et al. .... 100/233 |
| 5,821,425 A | | 10/1998 | Mariani et al. ................ 73/703 |
| 6,005,329 A | | 12/1999 | Ikeda et al. |
| 6,079,276 A | | 6/2000 | Frick et al. .................... 73/718 |

(Continued)

FOREIGN PATENT DOCUMENTS

EP     1143504 A1    10/2001

(Continued)

OTHER PUBLICATIONS

PCT-Notification of Transmittal of The International Search Report and The Written Opinion of the International Searching Authority, or the Declaration, Date of Mailing Jun. 23, 2005.

*Primary Examiner*—Kevin Kerns
*Assistant Examiner*—Michael Aboagye
(74) *Attorney, Agent, or Firm*—Kermit D. Lopez; Luis M. Ortiz

(57) ABSTRACT

A pre-load weld fixture apparatus and method are disclosed, which include a stationary pivot block attached to a base, wherein the stationary pivot block is located adjacent to a nest for maintaining an object to be welded. Additionally a pivot arm is associated with a pivot arm insert, wherein the pivot arm rotates about a pivot point provided by a pin press component associated with the stationary pivot block, such that the pivot point is fixed to the stationary pivot block in relation to the object to be welded and wherein the pivot arm is positioned parallel to the nest. A spring block can be connected to the stationary pivot block, wherein the spring block provides tension to the pivot arm in order to permit a user to maintain the object upon the base with a desired tension for welding thereof. Finally, a torsion spring can be maintained by the spring block, wherein the torsion spring allows the spring block to provide tension to the pivot arm.

16 Claims, 6 Drawing Sheets

U.S. PATENT DOCUMENTS

| | | | |
|---|---|---|---|
| 6,189,210 B1 * | 2/2001 | Cox et al. | 29/861 |
| 6,218,936 B1 | 4/2001 | Imao | 340/447 |
| 6,222,151 B1 | 4/2001 | Ziolkowski et al. | |
| 6,259,360 B1 | 7/2001 | Takamura | 340/445 |
| 6,450,021 B1 | 9/2002 | Katou et al. | 73/146.5 |
| 6,484,585 B1 | 11/2002 | Sittler et al. | 73/718 |
| 6,571,638 B1 | 6/2003 | Hines et al. | 73/702 |

FOREIGN PATENT DOCUMENTS

| | | |
|---|---|---|
| GB | 2251571 A | 7/1992 |

* cited by examiner

ADJUSTABLE FORCE AND POSITION PRE-LOAD WELDING FIXTURE

TECHNICAL FIELD

Embodiments are generally related to sensing methods and systems. Embodiments are also related to pressure and temperature sensors. Embodiments are additionally related to surface acoustic wave (SAW) devices and sensors. Embodiments are additionally related to welding fixture devices and welding techniques thereof.

BACKGROUND OF THE INVENTION

Various sensors are known in the pressure and temperature sensing arts. The ability to detect pressure and/or temperature is an advantage to any devices which are under constant temperature and which can be severely affected by temperature conditions. An example of such a device is an automobile tire, which of course, experiences variations in both temperature and pressure. Many different techniques have been proposed for sensing the pressure and/or temperature in tires, and for delivering this information to the operator at a central location on the vehicle so that he knows that a tire is at low or high air pressure.

Such sensors generally communicate with the vehicle so that the sensed pressure and/or temperature are displayed to the operator when the vehicle is moving, i.e. the wheel rotating relative to the body of the vehicle. Such devices are generally relatively complex and expensive or alternatively are not particularly robust.

Some tire pressure and/or temperature sensor systems incorporate a sensor that is fixed to the body so no rotating electrical contact between the rotating wheel and the chassis is required. In this system, a sensor rod is deflected by contact with the tire sidewall when the sidewall of the tire is deformed as occurs when the tire pressure is low. This system provides an indication of low tire pressure but is not robust. For example mud or other debris on the wheels may cause faulty readings. Furthermore, this system provides an indication only when the tire pressure is reduced significantly as is necessary for significant tire bulge to occur. Clearly such a system simply cannot provide a reading of actual tire pressure.

In another form of fixed sensor the height of the vehicle can be detected and when the height is reduced, it is deemed tire pressure is low. However, if the tire in a rut or is parked on uneven ground, a faulty low-pressure reading is likely to be generated.

More complicated systems are capable of monitoring tire pressure. For example, some pressure sensor systems utilize a rotating encoder formed by a multi-polar ring of magnetic segments of different polarity that are distributed circumferentially in a regular and alternating manner. A transmitter coil coaxial with the ring and a fixed pickup (an induction coil system) is energized by alternating electrical current flowing through the transmitter coil to generate a magnetic field superimposed on the magnetic field created by the multi-polar ring generates a signal picked up and delivers a signal relating the rotating characteristic of the wheel and thus, the state of the tire.

Some tire pressure systems also utilize a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator. Conventional wireless systems, however, are not durable and are expensive to design and produce.

One type of sensor that has found wide use in pressure and temperature sensing applications, such as, vehicle tires, is the Surface Acoustic Wave (SAW) sensors, which can be composed of a sense element on a base and pressure transducer sensor diaphragm that is part of the cover. For a SAW sensor to function properly, the sensor diaphragm should generally be located in intimate contact with the sense element at all pressure levels and temperatures.

To compensate for expansion in the packaging, the sense element and sensor diaphragm must be preloaded when they are assembled to shift the output frequency a known amount, which ensures contact at all times. In conventional sensor designs, an interference fit between the cover and base can maintain a preload until the cover and base are locked in place by welding, soldering or other connecting means.

In order to properly configure a sensor, such as a SAW sensor, the sensing device should include a sensor cover and a sensor base which are welded in order form a hermitic seal thereof. One of the problems with conventional welding devices and fixtures utilizing in forming sensor devices is that the sensing element is often at the mercy of the fixture load, which can subject the sensor elements (e.g., quartz component) within the sensor package to damage and/or prevent a true hermetically seal package from being formed. In general, a SAW sensor assembly or package requires a pre-load of a pre-determined force indirectly onto the quartz component while the top and bottom housing (i.e., sensor cover and sensor base, respectively) that enclose the sensor are spot-welded together. A fixture is needed which provides an allowed adjustable spring tension and positions in relation to the sensor without affecting the upper and lower housing parallelism in relation to the pivot arm and nest.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor assembly method and system.

It is another aspect of the present invention to provide an improved method and system for welding components to a sensor during assembly thereof.

It is yet another aspect of the present invention to provide a welding fixture technique for use in assembling sensor packages, such as, for example, SAW sensor devices.

The aforementioned aspects of the invention and other objectives and advantages can now be achieved as described herein. A pre-load weld fixture apparatus and method are disclosed herein, which provide multiple options that permit a user to adjust torsion spring loads and position without affecting the parallelism between the individual parts, nest or pivoting arm. Pre-load weld fixture apparatus is generally configured from copper to help dissipate heat and to resist welding to the housing materials. Additionally, pre-load weld fixture apparatus includes a one-piece sensor nest, adjustable position torsion spring block, torsion spring, stationary pivot block, and pivot arm. The sensor nest, pivot arm and pivot arm insert are generally configured from a copper material to help dissipate heat and to prevent accidental welding of the housing to the nest or pivot arm.

The pivot arm includes copper insert pressed in place that allows clearance between the pivot arm and the metal pins on the sensor package, which allows the user to rotate the sensor in the nest for multiple spot welding positions. The pivot arm generally can rotate on a pin press fit formed into the stationary block, which is bolted to the one-piece base. The pivot point is a fixed in relation to the sensor and is parallel to the one-piece nest. The adjustable block which bolted to the stationary block generally provides the pivot arm tension. The adjustable block can include a setscrew that provides the location/rotation point feature for the torsion spring. The adjustable block also can include two adjustment slots on each side for tension adjustment thereof to permit the user to move the block forward for more tension or backwards to lessen the tension applied to the sensor package and/or specific components of the sensor package, such as quartz components and/or other sense elements.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
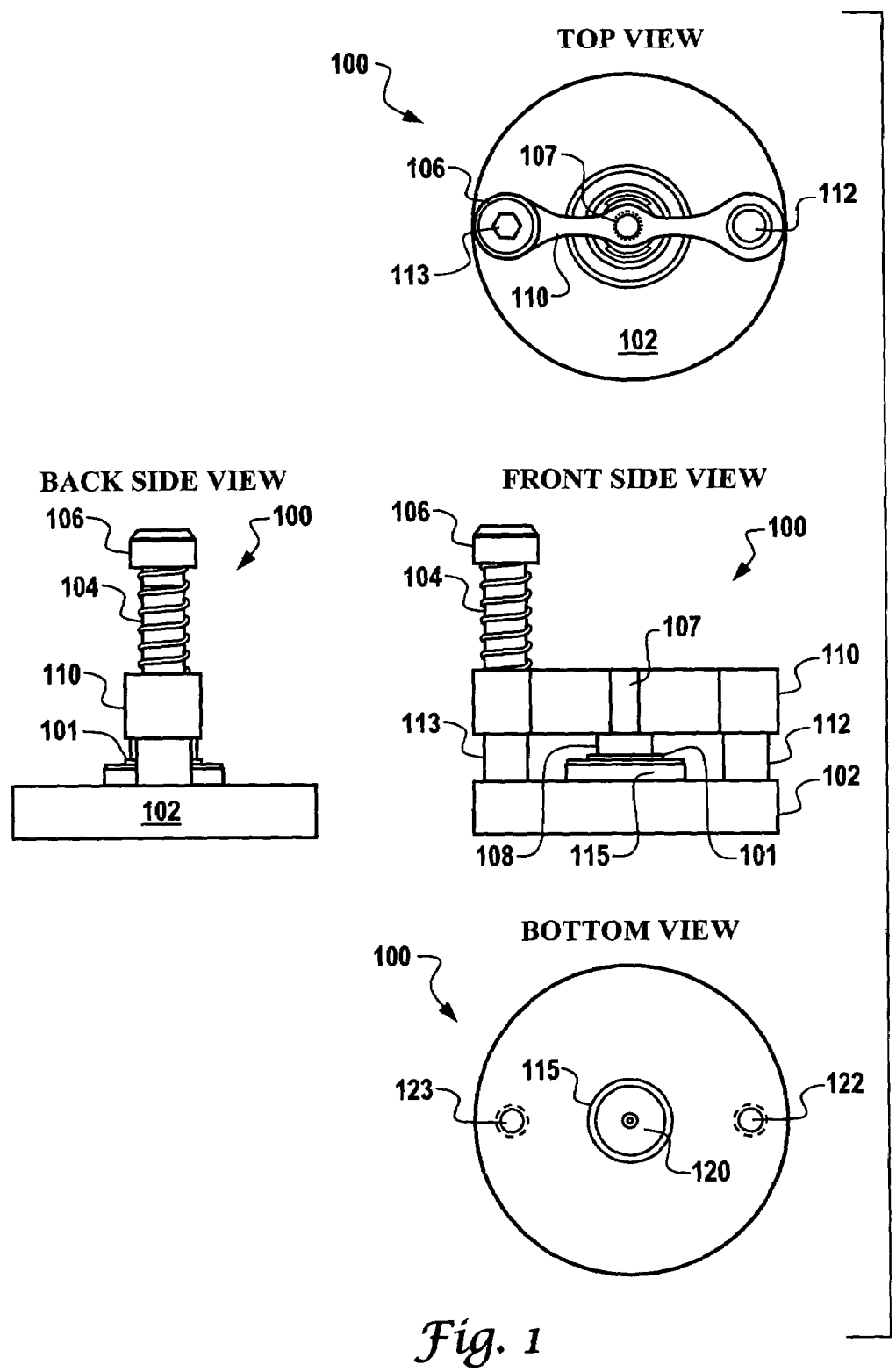
FIG. 1 illustrates various views of a weld fixture, which can be implemented in accordance with one embodiment of the present invention.
Figure 2:
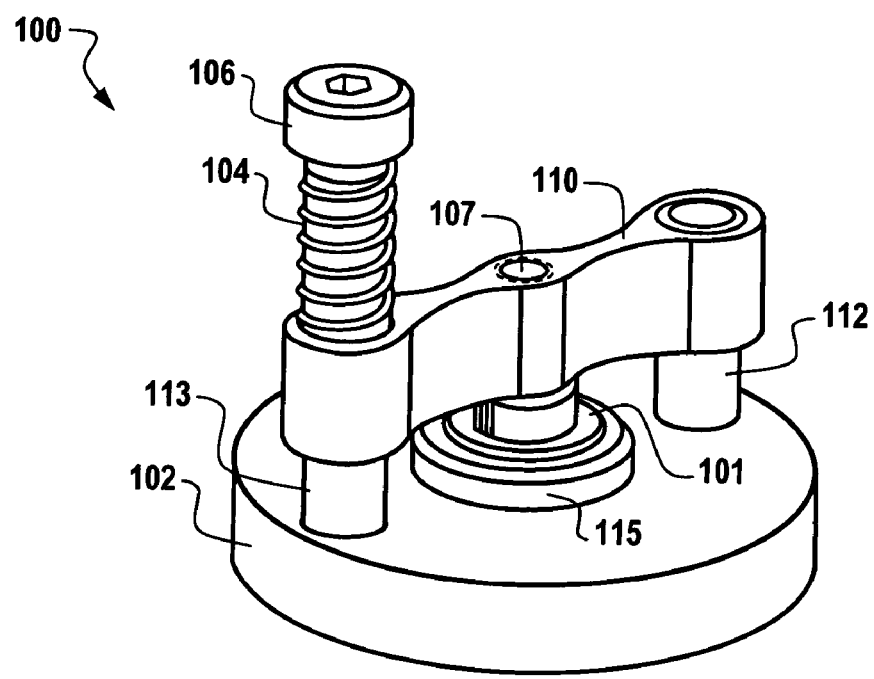
FIG. 2 illustrates a side perspective view of the weld fixture apparatus depicted in FIG. 1, in accordance with one embodiment of the present invention.
Figure 3:
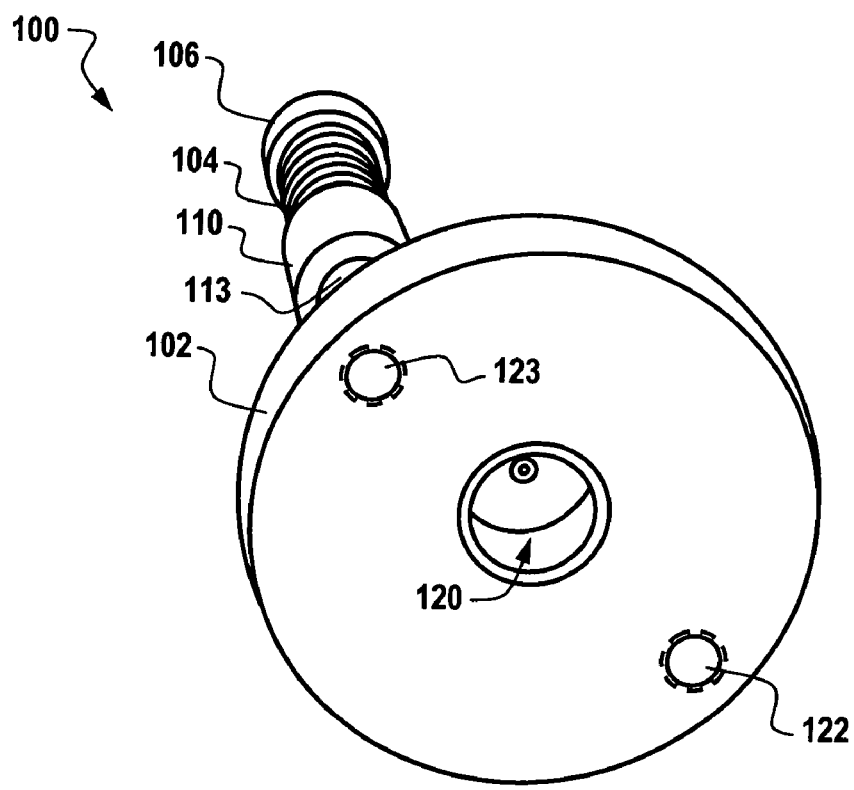
FIG. 3 illustrates a bottom perspective view of the weld fixture apparatus depicted in FIGS. 1 and 2, in accordance with one embodiment of the present invention.

FIG. 1 illustrates various views of a weld fixture 100, which can be implemented in accordance with one embodiment of the present invention. Top and bottom views of weld fixture 100 are disclosed in FIG. 1, along with back side and front side views. FIG. 2 illustrates a side perspective view of the weld fixture 100 depicted in FIG. 1, in accordance with one embodiment of the present invention. Additionally, FIG. 3 illustrates a bottom perspective view of the weld fixture 100 depicted in FIGS. 1 and 2, in accordance with one embodiment of the present invention. In FIGS. 1–3, similar or identical parts are generally indicated by identical reference numerals.

Weld fixture 100 generally includes a fixture base 102 upon which a sensor package 101 having a sensor base (not shown in FIG. 1) and a sensor cover (also not shown in FIG. 1) can be positioned and located for welding via weld fixture 100. Fixture base 102 can be formed from a material such as copper. In generally fixture base 102 functions a locator, and includes a locator hold 120 for last placement via a welding mechanism (e.g., a laser welding mechanism), which is described in greater detail here. A load bar 110 is generally associated with a spring 104, such that load bar 110 provides a specific weight to fixture base 102 in order to assist in maintaining the sensor cover and the sensor base of sensor package 101 parallel to one another upon fixture base 102.

Sensor package 101 is preferably located below a central portion 107 of load bar 110. Spring 104 is capped by a shouldered cap screw 106. Additionally, an adjustable load foot 108 can be located above the fixture base 102, such that the adjustable load foot 108 applies a pre-determined load with a specific weight to the sensor base in order to maintain the sensor cover and the sensor base securely in place as the sensor base and the sensor cover are welded to one another in order to configure sensor package 101.

A plurality of guideposts 112 and 113, which function as locator pins can be associated or integrated with the load bar 110 in order to assist in maintaining the sensor cover and the sensor base of sensor package 101 parallel to one another upon fixture base 102. Note that sensor package 101 can be configured as a SAW sensor device (e.g., a SAW "button" sensor), which includes one or more quartz components. An example of such a SAW sensor device is described in greater detail herein with respect to FIG. 4, including sensor base and sensor cover components thereof. Fixture base 102 additionally includes holes 123 and 122 which can be utilized to respectively engage guideposts 112 and 113 at fixture base 102.

Figure 4:
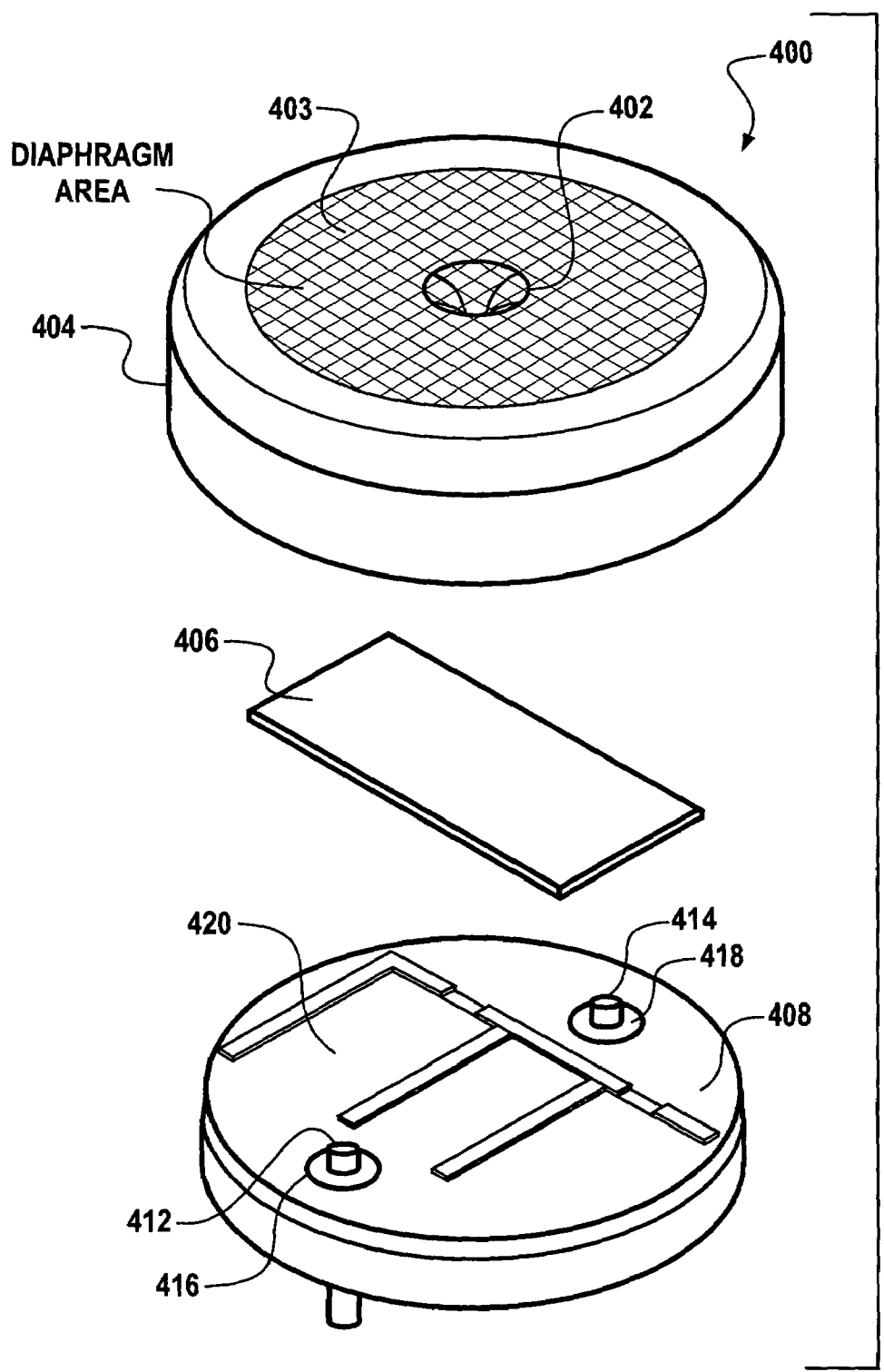
FIG. 4 illustrates an exploded view of a sensor package, which can be implemented in accordance with one embodiment of the present invention.

In general, sensor package 101, such as, for example, a SAW sensor assembly, requires a weld process that will not affect the pre-determined load on any of the SAW quartz components inside sensor package 101 when the sensor cover is welded to the base of sensor package 101 (i.e., see FIG. 4 for sensor cover and sensor base). Thus, weld fixture 100 can be utilized to hold the sensor cover and sensor base in parallel with each other at a specific load. Additionally, as will be explained in greater detail herein, a welding method can be implemented which includes spot weld, stitch welds, and a final weld at various power and welding size setting so as not to apply additional loads or resulting in un-loading of the quartz components within the sensor package 101.

FIG. 4 illustrates an exploded view of a sensor package 400, which can be implemented in accordance with one embodiment of the present invention. Sensor package 400 of FIG. 4 is generally analogous to sensor package 101 of FIG. 1. Sensor package 400 can be utilized, for example, as a pressure sensor that includes a sense element 406, a sensor base 408, and a cover 404 that contains a flexible diaphragm 403 and a dimple 402.

For the sensor to achieve the application accuracy required, the dimple 402 should be in intimate contact with the sense element 406 at all pressure levels and temperatures. To compensate for thermal expansion of the packaging materials (i.e., base 408 and cover 404), the sense element 406 (e.g., a quartz sense element) and the sensor diaphragm 403 can be preloaded when assembled, in order to shift the output frequency a known amount to ensure contact at all times.

Note that although the sensor package 400 can be implemented as a SAW pressure sensor, it can be appreciated that alternative embodiments of the present invention can be implemented in the context of a non-SAW sensors. For example, rather than utilizing a quartz sense element, other types of sense elements (e.g., ceramic, silicon and the like) may be utilized in accordance with alternative embodiments of the present invention.

The dimple 402 can be formed in the center of the pressure sensor diaphragm 403 portion of the cover 404 during its manufacture. The dimple 402 generally contacts a flat surface on the sense element 406. In general, the sensor package 400 can be embodied as a small, circular component. The design configuration is generally implemented as small, circular, hermetically sealed button package. Example dimensions include approximately 12 mm in diameter and approximately 2 mm thick. It can be of course be appreciated that such dimensions are mentioned for illustrative purposes only, and are not considered limiting features of the present invention. The dimensions of sensor package 400 can vary, depending on the needs and use of such a device.

The design of the cover 404 and base 408 are such that it generally allows for the reduction of assembly tolerances. The sensor material of the base 408 and cover 404 can be formed from stainless steel 17-7 PH. The advantages of such a material are discussed in greater detail herein. The pressure sensor can also be configured in association with an interface design board. For example, a PCB or flex circuit interconnect can be located between the pressure sensor button package and one or more antennas thereof for the transmission and receipt of wireless data.

Sensor package 400 generally includes a package cover 404 that includes a dimple 402 formed at the center of diaphragm 403. In FIG. 4, the diaphragm area of diaphragm 403 is indicated generally by a circular dashed line. Similarly, dimple 402 is generally indicated also by a circular dashed line. The diaphragm 403 is the flat surface on the top of cover 402.

Sense element 106 can be implemented, for example, as a quartz sense element, a ceramic sense element, a silicon sense element and the like. A SAW chip, for example, can be utilized as sense element 406. Base 408 includes a base portion 220, which can be recessed into base 408 and in which the sensor element or sense element 406 can rest.

Cover 404 can be initially formed from a flat sheet stock that is approximately 0.50 mm thick in the annealed condition. The cover can next be stamped into a circular shape, and deep drawn into a cup configuration. Next, dimple 402 can be formed into the center of the diaphragm 403 portion of cover 404, such that dimple 402 is formed approximately 0.6 mm deep into cover 404. It can be of course be appreciated that such dimensions are discussed herein for illustrative purposes only, and are not considered limiting features of the present invention. Again, the dimensions of cover 404 may vary, depending on the needs and use of such a device.

Base 408 can also be formed from a stainless steel such as a stainless steel 17-7 PH material. Stamping approximately 2 mm thick annealed material into a circular disk can form base 408. Such a disk can be formed so that two small saddles are protruding from base 408 for which the sensor chip (e.g., a sense element 406) will rest. Holes 416 and 418 can thus be punched into base 408 to facilitate glass to metal seals thereof. Hole 416 is associated with pin 412, while hole 418 is associated with pin 414. Pins 412 and 414 can be utilized to make electrical connection through the hermetic seal.

Figure 5:
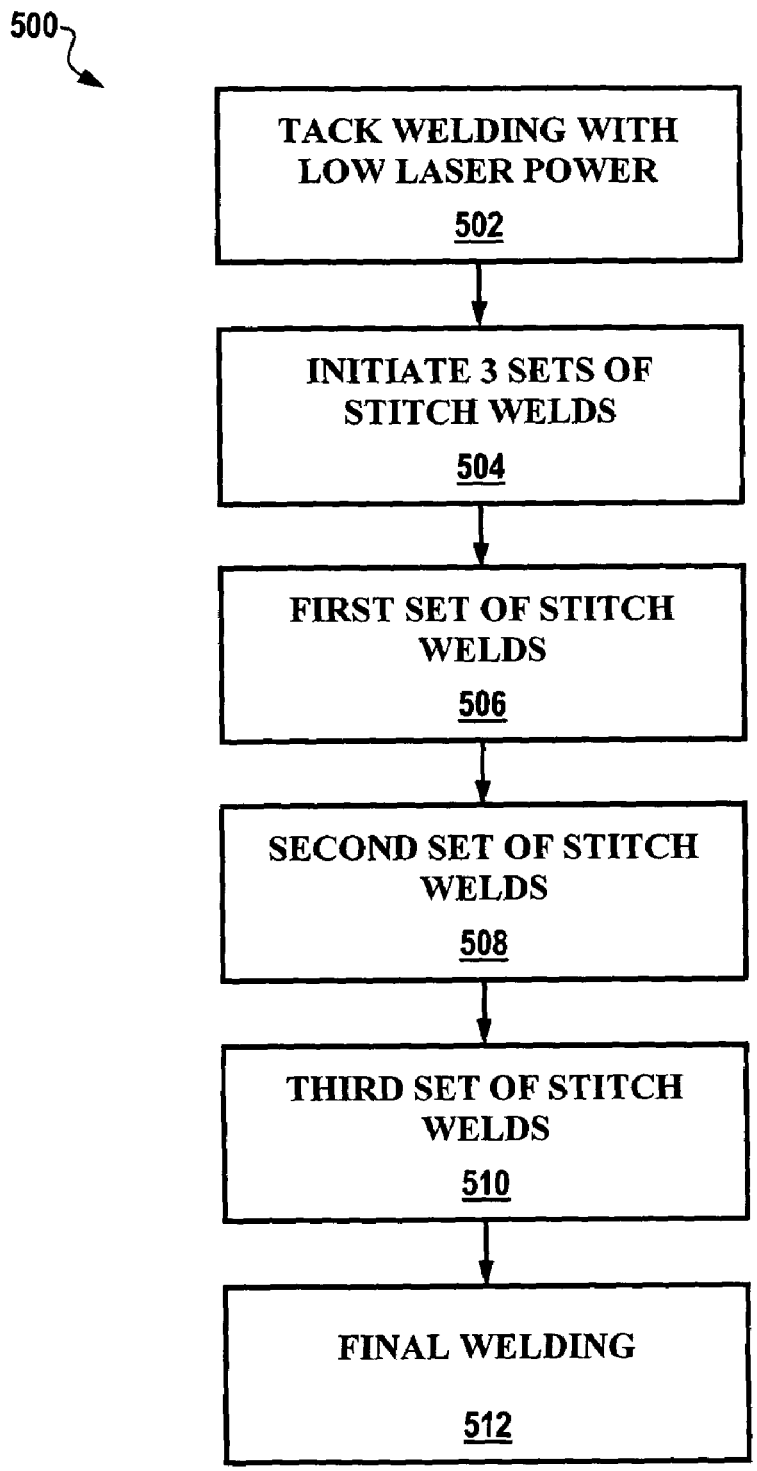
FIG. 5 illustrates a high-level flow chart depicting a welding method, which can be implemented in accordance with one embodiment of the present invention.

FIG. 5 illustrates a high-level flow chart 500 depicting a welding method, which can be implemented in accordance with one embodiment of the present invention. The weld process can be composed generally of 3 individual steps. All reference to location on the circular part is made using a clock face naming convention. The first step is a tack weld, which is generally indicated by block 502 of flow chart 500. The operation depicted at block 502 can be accomplished utilizing a low laser power welding mechanism, such that the part to be welded is located perpendicular to the laser beam generated by the welding mechanism. The part is welded with one tack weld at 4 points located at 12, 6, 3, and 9 o'clock respectively.

The second process step involves stitch welding, which is generally initiated as indicated at block 504. The stitch welding process is composed of 3 sets of stitch welds, which are respectively depicted at blocks 506, 508 and 510. The part to be welded is generally located at about a 65-degree angle from the laser beam generated by the welding mechanism . . . The first set of stitch weld, as illustrated at block 506, can begin at 9, 3, 6, and 12 o'clock and can be 1 hour counterclockwise in length. The second set of stitch welds as depicted at block 508 can start where the first set of stitch welds finished at 8, 2, 5, and 11 o'clock. The third and final set of stitch welds, as depicted at block 510, can begin at the finish of the second stitch weld at 7, 1, 4, and 10 o'clock. Once the third set of stitch welds are complete, the part or component is completely welded around the entire perimeter (e.g., the perimeter of sensor package 400 depicted in FIG. 4). The third and final step to the weld process is the final weld, which is generally indicated at block 512. This weld can be completed with a higher power laser that starts at 12 o'clock and completely circles the part to finish at 12 o'clock while the part is generally located at about 65 degrees form the laser beam.

Figure 6:
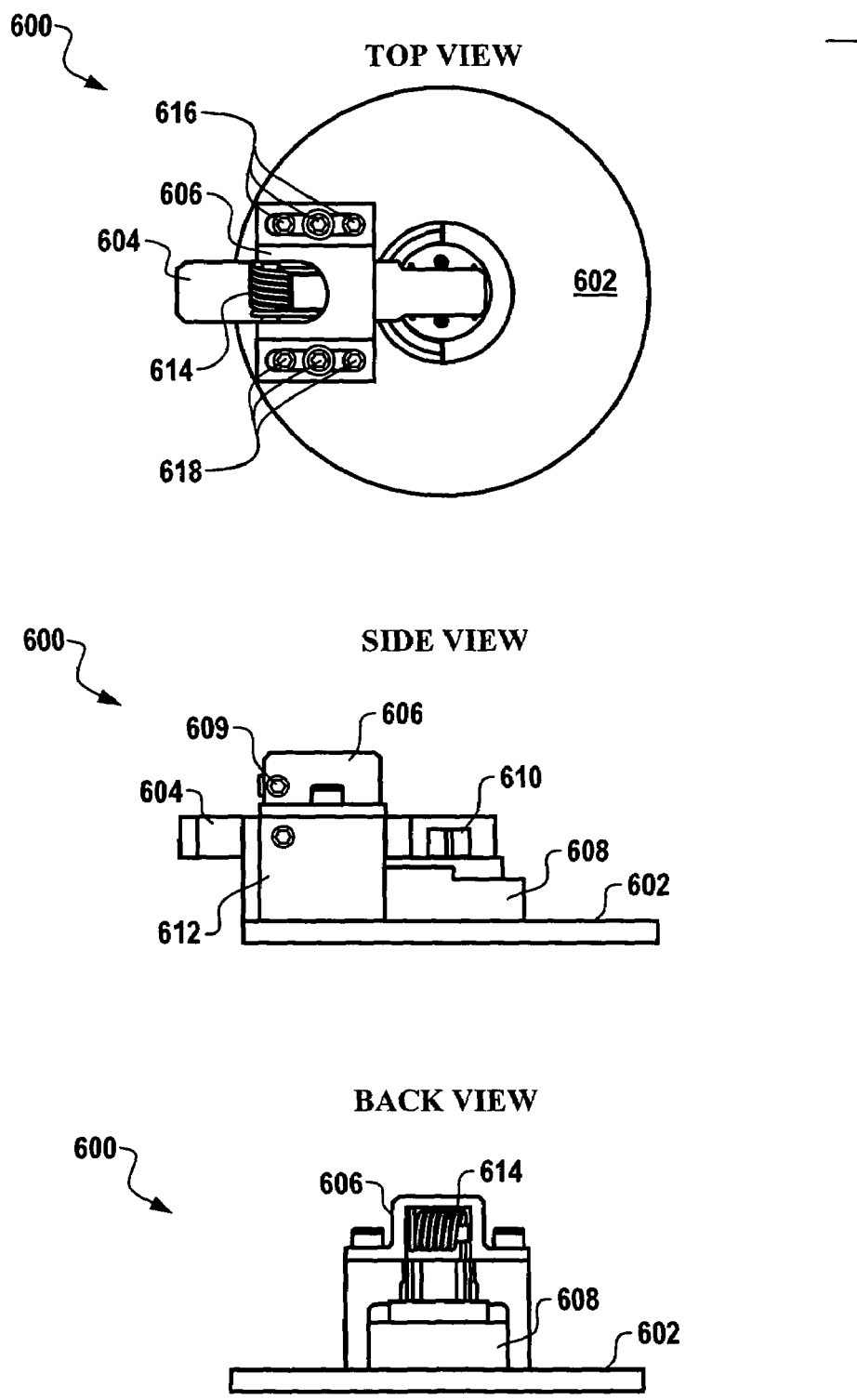
FIG. 6 illustrates top, side and back views of a pre-load weld fixture apparatus, which can be implemented in accordance with a preferred embodiment of the present invention.
Figure 7:
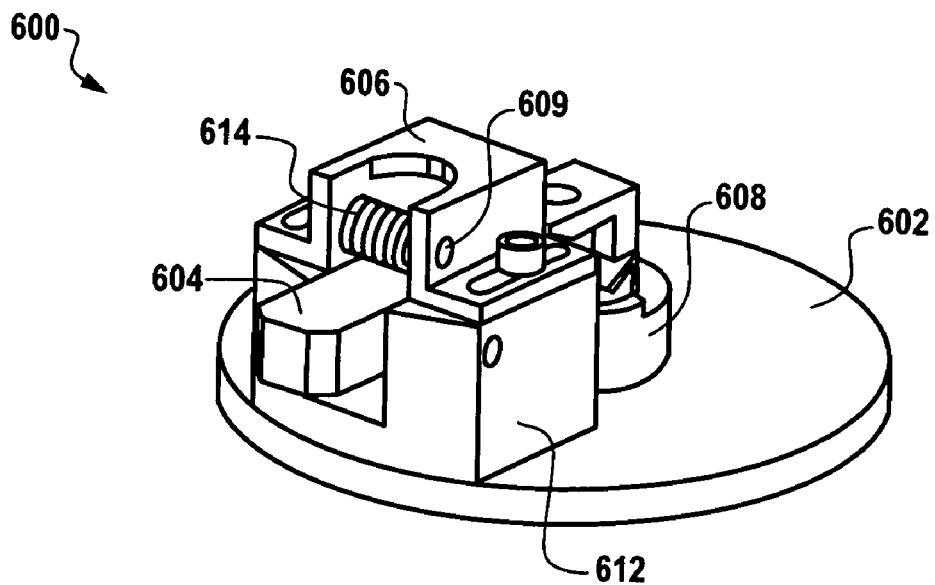
FIG. 7 illustrates a back perspective view of the pre-load weld fixture apparatus shown in FIG. 6, in accordance with a preferred embodiment of the present invention.
Figure 8:
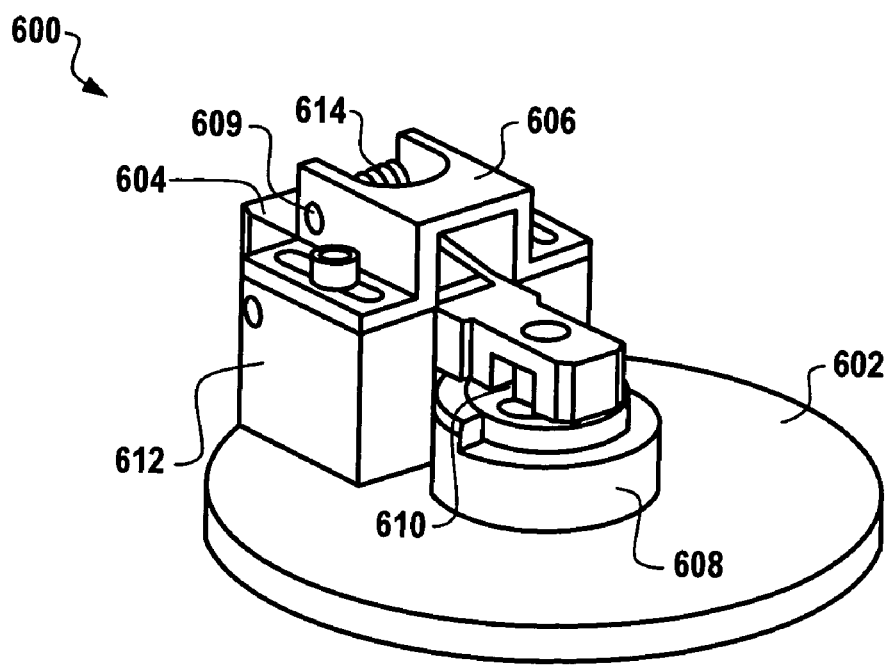
FIG. 8 illustrates a side perspective view of the pre-load weld fixture apparatus shown in FIG. 6, in accordance with a preferred embodiment of the present invention.

FIG. 6 illustrates top, side and back views of a pre-load weld fixture apparatus 600, which can be implemented in accordance with a preferred embodiment of the present invention. FIG. 7 illustrates a back perspective view of the pre-load weld fixture apparatus 600 shown in FIG. 6, in accordance with a preferred embodiment of the present invention. FIG. 8 illustrates a side perspective view of the pre-load weld fixture apparatus 600 shown in FIG. 6, in accordance with a preferred embodiment of the present invention. Thus, in FIGS. 6–8, similar or identical parts or elements are generally indicated by identical reference numerals. Pre-load weld fixture apparatus 600 differs from the fixture 100 of FIGS. 1–3 in that pre-load weld fixture apparatus 600 promotes a pre-load of a pre-determined force in-directly onto the sensor while the top and bottom covers or components that enclose the sensor are spot-welded together.

Referring now to FIGS. 6–8, it can be seen that pre-load weld fixture apparatus 600 generally includes a stationary pivot block 612, which is attached to a base 602. The stationary pivot block 612 is located adjacent to a one-piece sensor nest 608 for maintaining an object, such as a sensor housing or enclosure, which is be welded utilizing pre-load weld fixture apparatus 600. The nest 608 is generally located above and upon base 602. Pre-load weld fixture apparatus 600 also includes a pivot arm 604, which is generally associated with a pivot arm insert 610. The pivot arm 604 rotates about a pivot paint provided by a pin press component associated with stationary pivot block 612, such that the pivot point is fixed to the stationary pivot block 612 in relation to the object to be welded. The pivot arm 604 is also positioned parallel to the nest 608.

Pre-load weld fixture apparatus 600 also includes an adjustable position torsion spring block 606, which is bolted to stationary pivot block 612. The spring block 606 provides tension to the pivot arm 604 in order to permit a user to maintain the object (e.g., a sensor housing and sensor therein) upon base 602 with a desired tension for welding thereof. Pre-load weld fixture apparatus 600 additionally includes a torsion spring 614, which is maintained by spring block 606. Torsion spring 614 allows spring block 606 to provide tension to pivot arm 604. Spring block 606 also includes setscrews 616 and 618, which can provide the location/rotation point feature for torsion spring 614.

Nest 608, pivot arm 604, and pivot arm insert 610 can be formed from a copper material in order to dissipate heat and prevent accidental welding of the object (e.g., sensor package 400 of FIG. 4) to nest 608 or the pivot arm 604. Pivot arm insert 610 can generally be configured as a copper insert that permits clearance between pivot arm 604 and a plurality of metal pins (not shown in FIG. 6) associated with the object to be welded (e.g., see sensor package 400 of FIG. 4), thereby permitting the user to rotate the object in nest 608 for multiple spot welding positions.

One or more adjust slots, such as slot 609, can be formed on either side of spring block 606, which permit a user to move spring block 606 to positions which provide more tension or less tension for application to the object (e.g., see sensor package 400 of FIG. 4) to be welded. Thus, the adjustable spring block 606 can be configured with two adjustment slots on each side thereof for tension adjustment, thereby allowing a user to move spring block 606 forward for more tension or backwards to lessen the tension applied to sensor components, such as, for example, sense element 406 of FIG. 4. Thus, pre-load weld fixture apparatus 600 can be utilized to maintain a sensor package (e.g., a SAW sensor device), such as sensor package 406 of FIG. 4, while top and bottom housings of such a sensor package are welded to one another.

Based on the foregoing, it can be appreciated that a SAW sensor assembly such as sensor package 400 of FIG. 4 requires a pre-load of a pre-determined force in-directly onto the quartz sensor while the top and bottom housing that enclose the sensor are spot-welded together. A fixture is therefore required, which allows adjustable spring tension and positions in relation to the sensor without affecting the upper and lower housing parallelism in relation to the pivot arm and nest. The fixture also has to be small enough to fit onto the laser-rotating table, be configured from copper to dissipate heat, clearance for the housing base pins to allow the sensor to be rotated in the nest for additional welding and also needs to hold the top and bottom housings parallel to each other while under pre-load.

The preferred embodiment of FIGS. 6–8 solves these problems by illustrating a small pre-load weld fixture apparatus 600 with multiple options that allow a user to adjust torsion spring loads and position without affecting the parallelism between the individual parts, nest or pivoting arm. The fixture weld apparatus 600 can be made configured from copper to help dissipate heat and to resist welding to the housing materials of the sensor package or object to be welded.

Pre-load weld fixture apparatus generally includes a one-piece sensor nest 610, an adjustable position torsion spring block 606, a torsion spring 614, a stationary pivot block 612, and a pivot arm 604. The sensor nest 608, pivot arm 604 and pivot arm insert 610 are configured from copper in order to promote heat dissipation and to prevent accidental welding of the sensor package or sensor housing to the nest 608 or pivot arm 604. Pivot arm 604 includes copper insert 610 pressed in place to provide a clearance between pivot arm 604 and metal pins that may be located on the sensor package housing base. Note that such a housing base should not be confused with base 602. An example of such a housing base is shown in FIG. 4 (i.e., see base 408). Such a feature allows the user to rotate the sensor in the nest 608 for multiple spot welding positions. Pivot arm 604 can rotate on a pin press fit into the stationary pivot block 612, which is bolted to the one-piece base 602. The pivot point is preferably fixed in relation to the sensor and is parallel to the one-piece nest 608. The adjustable block 606, which is bolted to the stationary block 612, provides the pivot arm tension.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A pre-load weld fixture apparatus, comprising:
   a stationary pivot block attached to a base, wherein said stationary pivot block is located adjacent to a nest for maintaining an object to be welded, wherein said nest is located above and upon said base;
   a pin press component associated with said stationary pivot block;
   a pivot arm associated with a pivot arm insert, wherein said pivot arm rotates about a pivot point provided by said pin press component associated with said stationary pivot block, such that said pivot point is fixed to said stationary pivot block in relation to said object to be welded and wherein said pivot arm is positioned parallel to said nest, wherein said nest, said pivot arm, and said pivot arm insert are formed from a material that dissipates heat and prevents an accidental welding of said object to said nest or said pivot arm; and
   a spring block connected to said stationary pivot block, wherein said spring block provides tension to said pivot arm in order to permit a user to maintain said object upon said base with a desired tension for welding thereof.

2. The apparatus of claim 1 further comprising a torsion spring maintained by said spring block, wherein said torsion spring allows said spring block to provide said tension to said pivot arm.

3. The apparatus of claim 2 wherein said spring block comprises an adjustable position torsion spring block that includes a plurality of setscrews.

4. The apparatus of claim 1 wherein said spring block comprises a plurality of adjust slots formed on at least one side of said spring block, which permit a user to move said spring block to provide more tension or less tension for application to said object to be welded.

5. The apparatus of claim 1 wherein said object to be welded comprises a sensor device.

6. The apparatus of claim 5 wherein said sensor device comprises a SAW sensor device having at least one quartz component therein.

7. The apparatus of claim 6 wherein said SAW sensor device is maintained by a top housing and a bottom housing, wherein said top housing and said bottom housing are welded to one another while said SAW sensor device is maintained within said nest upon said base.

8. The apparatus of claim 1 wherein said material comprises copper.

9. The apparatus of claim 1 wherein said pivot arm insert comprises a copper insert that permits clearance between said pivot arm and a plurality of metal pins associated with said object to be welded, thereby permitting said user to rotate said object in said nest for multiple spot welding positions.

10. A pre-load weld fixture apparatus, comprising:
a stationary pivot block attached to a base, wherein said stationary pivot block is located adjacent to a nest for maintaining a sensor enclosure to be welded together, wherein said nest is located above and upon said base;
a pivot arm associated with a pivot arm insert, wherein said pivot arm rotates about a pivot point provided by a pin press component associated with said stationary pivot block, such that said pivot point is fixed to said stationary pivot block in relation to said sensor enclosure and wherein said pivot arm is positioned parallel to said nest, wherein said nest, said pivot arm, and said pivot arm insert are formed from a copper material in order to dissipate heat and prevent accidental welding of said sensor enclosure to said nest or said pivot arm; and
an adjustable position torsion spring block connected to said stationary pivot block, wherein said adjustable position torsion spring block provides tension to said pivot arm via a torsion spring maintained by said adjustable position torsion spring block in order to permit a user to maintain said sensor enclosure upon said base with a desired tension for welding thereof.

11. The apparatus of claim 10 wherein said sensor enclosure comprises a top housing and a bottom housing for maintaining a SAW sensor device therein, including at least one quartz component, wherein said top housing and said bottom housing are welded to one another while said SAW sensor device is maintained by said nest upon said base.

12. The apparatus of claim 10 wherein said pivot arm insert comprises a copper insert that permits clearance between said pivot arm and a plurality of metal pins associated with said sensor enclosure, thereby permitting said user to rotate said sensor enclosure in said nest for multiple spot welding positions.

13. A weld fixture method, comprising the steps of:
attaching a stationary pivot block to a base, wherein said stationary pivot block is located adjacent to a nest for maintaining an object to be welded, wherein said nest is located above and upon said base, said object to be welded comprising a sensor device, wherein said sensor device comprises a SAW sensor device having at least one quartz component therein, wherein said SAW sensor device is maintained by a top housing and a bottom housing, wherein said top housing and said bottom housing are welded to one another while said SAW sensor device is maintained within said nest upon said base;
associating a pivot arm with a pivot arm insert, wherein said pivot arm rotates about a pivot point provided by a pin press component associated with said stationary pivot block, such that said pivot point is fixed to said stationary pivot block in relation to said object to be welded and wherein said pivot arm is positioned parallel to said nest; and
connecting a spring block to said stationary pivot block, wherein said spring block provides tension to said pivot arm in order to permit a user to maintain said object upon said base with a desired tension for welding thereof.

14. The method of claim 13 further comprising the step of:
associating a torsion spring with said spring block, wherein said spring block maintains said torsion spring in order to provide said tension to said pivot arm.

15. The method of claim 14 further comprising the step of configuring said spring block as an adjustable position torsion spring block that includes at least one setscrew.

16. The method of claim 13 further comprising the step of configuring said spring block to comprise a plurality of adjust slots formed on at least one side of said spring block, which permit a user to move said spring block to provide more tension or less tension for application to said abject to be welded.

* * * * *